(12) United States Patent
Barger et al.

(10) Patent No.: US 11,791,058 B2
(45) Date of Patent: Oct. 17, 2023

(54) PELLET HANDLING APPARATUS AND FUEL ROD LOADING METHOD

(71) Applicant: BWXT mPower, Inc., Charlotte, NC (US)

(72) Inventors: Earl Brian Barger, Goode, VA (US); Jeffrey T. Lee, Blacksburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 16/933,521

(22) Filed: Jul. 20, 2020

(65) Prior Publication Data

US 2020/0350088 A1    Nov. 5, 2020

Related U.S. Application Data

(62) Division of application No. 14/207,995, filed on Mar. 13, 2014, now Pat. No. 10,720,252.

(60) Provisional application No. 61/783,671, filed on Mar. 14, 2013.

(51) Int. Cl.
| | |
|---|---|
| *G21C 21/02* | (2006.01) |
| *G21C 3/04* | (2006.01) |
| *G21C 3/334* | (2006.01) |
| *G21C 19/02* | (2006.01) |

(52) U.S. Cl.
CPC .............. *G21C 21/02* (2013.01); *G21C 3/048* (2019.01); *G21C 3/334* (2013.01); *G21C 19/02* (2013.01)

(58) Field of Classification Search
CPC ................................ G21C 21/00; G21C 21/02
See application file for complete search history.

(56) References Cited

U.S. PATENT DOCUMENTS

| | | | | |
|---|---|---|---|---|
| 4,687,605 A | * | 8/1987 | Cellier .................... | G21C 21/02 423/19 |
| 4,748,798 A | * | 6/1988 | Udaka ..................... | G21C 21/02 53/542 |
| 4,842,808 A | * | 6/1989 | Rieben .................... | G21C 21/02 53/154 |
| 4,960,559 A | * | 10/1990 | Fogg ....................... | G21C 21/02 206/443 |
| 4,980,119 A | * | 12/1990 | Schoenig, Jr. .......... | G21C 21/02 53/542 |
| 5,043,133 A | | 8/1991 | Ambert et al. | |
| 5,147,047 A | * | 9/1992 | Ahmed .............. | G01N 21/9508 209/939 |

(Continued)

OTHER PUBLICATIONS

International Search Report and Written Opinion, PCT/US2014/025748, dated Nov. 20, 2014, 8 pages.

(Continued)

*Primary Examiner* — Sharon M Davis
(74) *Attorney, Agent, or Firm* — Nelson Mullins Riley & Scarborough LLP

(57) ABSTRACT

A pellet magazine includes a plurality of pellet bores sized to receive pellets for loading into a fuel rod. A fuel rod loading system includes a plurality of pellet loading stations each designated to load a single pellet type into one or more pellet bores of the pellet magazine, a rod loading station configured to unload pellets from the pellet bores of the pellet magazine into a fuel rod, and a conveyance system configured to transport the pellet magazine to the loading stations and then to the rod loading station in a defined sequence.

14 Claims, 3 Drawing Sheets

(56) References Cited

U.S. PATENT DOCUMENTS

| | | | |
|---|---|---|---|
| 5,251,244 | A | 10/1993 | Wazybok et al. |
| 6,271,510 | B1 | 8/2001 | Boxen |
| 7,539,280 | B2 | 5/2009 | Bailey et al. |
| 7,593,501 | B2 | 9/2009 | Crawford |
| 10,720,252 | B2 | 7/2020 | Lee et al. |
| 2006/0146974 | A1 | 7/2006 | Crawford |
| 2006/0285626 | A1 | 12/2006 | Bailey et al. |
| 2011/0170654 | A1 | 7/2011 | Bueno et al. |
| 2011/0176650 | A1 | 7/2011 | Doerr et al. |

OTHER PUBLICATIONS

International Preliminary Report on Patentability, PCT/US2014/025748, dated Sep. 15, 2015, 7 pages.

* cited by examiner

PELLET HANDLING APPARATUS AND FUEL ROD LOADING METHOD

CLAIM OF PRIORITY

This application is a Division of U.S. patent application Ser. No. 14/207,995 filed on Mar. 13, 2014, now U.S. Pat. No. 10,720,252, which claims the benefit of U.S. Provisional Application No. 61/783,671 filed Mar. 14, 2013, the disclosures of which are hereby incorporated by reference in their entirety.

BACKGROUND

The following relates to the nuclear reactor fuel handling arts, nuclear fuel rod loading arts, nuclear fuel pellet handling arts, and related arts.

The nuclear reactor core of a nuclear reactor is typically assembled as a set of fuel rods. Each fuel rod comprises a hollow cylindrical cladding filled with fuel pellets (and/or possibly pellets of other types, such as spacer pellets, and/or pellets containing a neutron poison) and capped by end plugs. The composition, enrichment, and arrangement of the pellets loaded into a given fuel rod are chosen to provide designed reactivity or other characteristics. For example, one illustrative reactor core design includes fuel rods comprising uranium dioxide ($UO_2$) of various enrichment levels, and spike fuel rods comprising $UO_2Gd_2O_3$ for reactivity control. The enrichment (i.e. fissile $^{235}U$ concentration or fraction) of fuel pellets may be varied over the length of the fuel rod and/or among different fuel rod types. Typically, the pellets loaded into a given fuel rod are arranged as discrete axial zones along the length of the fuel rod, with each zone having a defined number of fuel pellets of the same defined composition and $^{235}U$ enrichment. The loading of the fuel pellets into the fuel rods must be done with exacting precision so that the assembled nuclear reactor core has the designed characteristics. Regulatory rules and best practices dictate that the fuel loading be documented and traceable so that the composition of each fuel rod is known and traceable throughout the manufacturing, shipping, and reactor fueling processes.

In so-called vibratory pellet loading methods, multiple pieces of empty fuel rods (with welded lower end plug) are placed on a large vibratory table. The upper ends of the rods fit within a transition element. The transition element guides the pellets from a v-trough into the rods. Pellets are arranged in the v-trough in the correct length in front of each transition. The table is then excited (i.e. vibrated) such that the pellets move under their own inertia into the rods. The process is repeated until all the segments are loaded.

The handling of large pellet trays is a significant challenge for operators. The trays must be loaded and unloaded for each enrichment zone. The loading time increases with the number of zones. Multiple rods are loaded at the station to minimize cycle time. Pellets of different types for the different axial zones may be arranged in the v-trough, raising the possibility of inadvertent mixing of pellets of different types.

Disclosed herein are improvements that provide various benefits that will become apparent to the skilled artisan upon reading the following.

BRIEF SUMMARY

In one disclosed aspect, a system comprises: a pellet magazine having a plurality of pellet bores wherein each pellet bore is open at least at one end and is sized to receive and retain pellets; a plurality of pellet loading stations wherein each pellet loading station is configured to transfer pellets of a single type into one or more pellet bores of the pellet magazine; a rod loading station configured to transfer pellets from the pellet bores of the pellet magazine into a nuclear fuel rod; and a conveyance system configured to convey the pellet magazine between the pellet loading stations of the plurality of pellet loading stations and then to the rod loading station in order to transfer an ordered stack of pellets from the plurality of pellet loading stations into a nuclear fuel rod. In some embodiments the pellet bores of the pellet magazine include longitudinal slots and the rod loading station includes an element configured to pass into the longitudinal slot and move along the longitudinal slot to push pellets out of the pellet bore. In some embodiments the conveyance system is configured to cooperate with the plurality of pellet loading stations to load the ordered stack of pellets into the pellet magazine as a plurality of ordered stack segments wherein each ordered stack segment is stored in one of the pellet bores, and the rod loading station is configured to transfer the ordered stack segments from the pellet bores of the pellet magazine into a nuclear fuel rod in order to transfer the ordered stack of pellets into the nuclear fuel rod. In some such embodiments, a gamma camera is configured to acquire a gamma radiation image of the pellet magazine with the ordered stack segments stored in the pellet bores.

In another disclosed aspect, a pellet magazine is disclosed, having a plurality of pellet bores wherein each pellet bore is open at least at one end and is sized to receive and retain $^{235}U$ enriched nuclear fuel pellets. The pellet bores of the pellet magazine may include longitudinal slots. An apparatus embodiment includes the pellet magazine and $^{235}U$ enriched nuclear fuel pellets disposed in at least one pellet bore of the pellet magazine.

In another disclosed aspect, a method is disclosed which uses a plurality of pellet loading stations and a nuclear fuel rod loading station. The method comprises: (i) transferring a pellet magazine to each pellet loading station of the plurality of pellet loading stations in succession in a predetermined order and, at each pellet loading station, loading pellets of a single type into one or more pellet bores of the pellet magazine; and, after operation (i) is complete, unloading the pellets from the pellet bores of the pellet magazine into a nuclear fuel rod at the nuclear fuel rod loading station in a predetermined unloading order so as to transfer an ordered stack of pellets into the nuclear fuel rod. In some embodiments, the operation (ii) includes unloading the pellets from the pellet bores of the pellet magazine into the nuclear fuel rod by operations including inserting an element into a longitudinal slot extending along a pellet bore of the pellet magazine and moving the inserted element along the longitudinal slot to push pellets out of the pellet bore. In some embodiments, after completing the operation (i), a gamma radiation image of the pellet magazine is acquired.

In another disclosed aspect, a system comprises: a pellet magazine including a plurality of pellet bores open at least at one end and sized to receive pellets; and a rod loading station configured to transfer pellets from the pellet bores into a fuel rod. The system may further include a plurality of pellet loading stations each configured to load pellets of a single type into the pellet bores of the magazine. The system may further include a conveyor belt or other conveyance system arranged to transfer the pellet magazine between the pellet loading stations and the rod loading station in a defined sequence.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
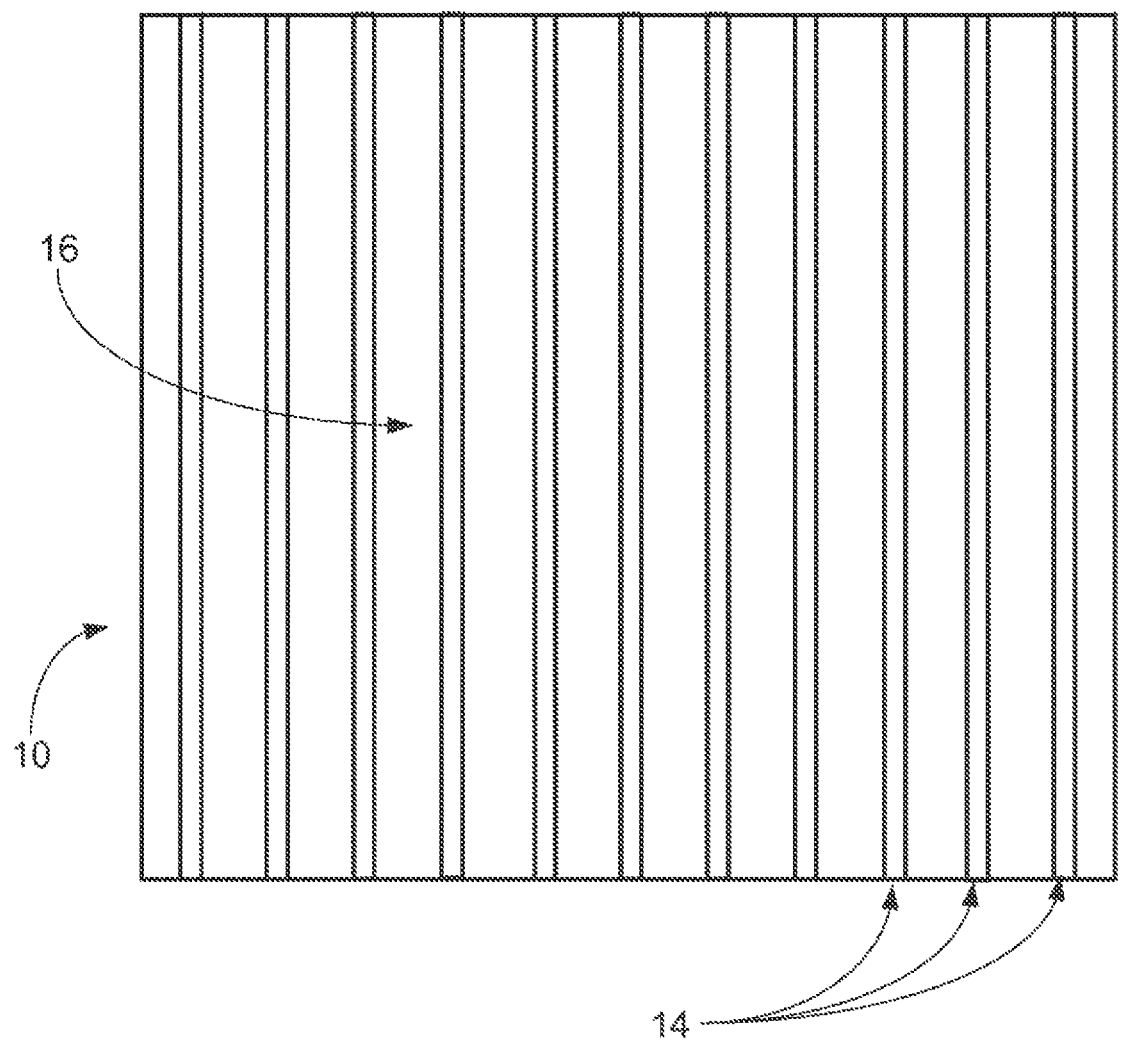
FIGS. 1 and 2 diagrammatically shows a bottom view and an end view, respectively, of a pellet magazine as disclosed herein.
Figure 2:
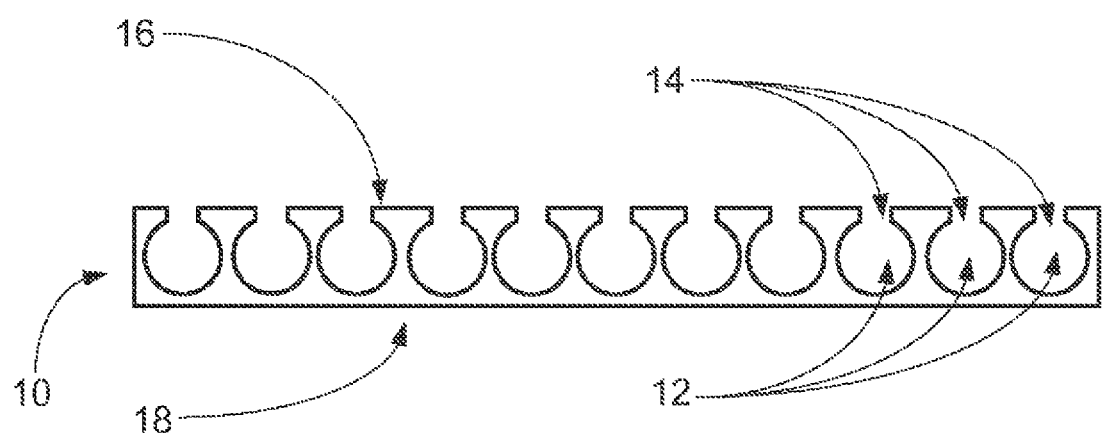

With reference to FIGS. 1 and 2, bottom and end views, respectively, of a pellet magazine 10 are shown. The pellet magazine 10 is a plate containing a plurality of parallel pellet bores 12 (see FIG. 2) sized to receive pellets to be loaded into the fuel rod. The illustrative pellet magazine 10 of FIGS. 1 and 2 includes eleven (11) parallel pellet bores 12, but a larger or smaller number of pellet bores may be employed. Optionally, the pitch of the magazine bores 12 is the same as the pellet storage/shipping trays. As seen in the end view of FIG. 2, each pellet bore 12 includes a longitudinal slot 14 running the length of the pellet bore 12 which admits an ejection finger (see FIG. 4) for pushing the pellets out of the pellet bore and into the fuel rod (optionally through a transition element that facilitates coupling of the pellet bore with the fuel rod). In the illustrative embodiment, the longitudinal slots 14 are at the magazine bottom 16 (see FIG. 1), and the magazine top 18 is continuous and does not have slot penetrations (see FIG. 2).

Figure 3:
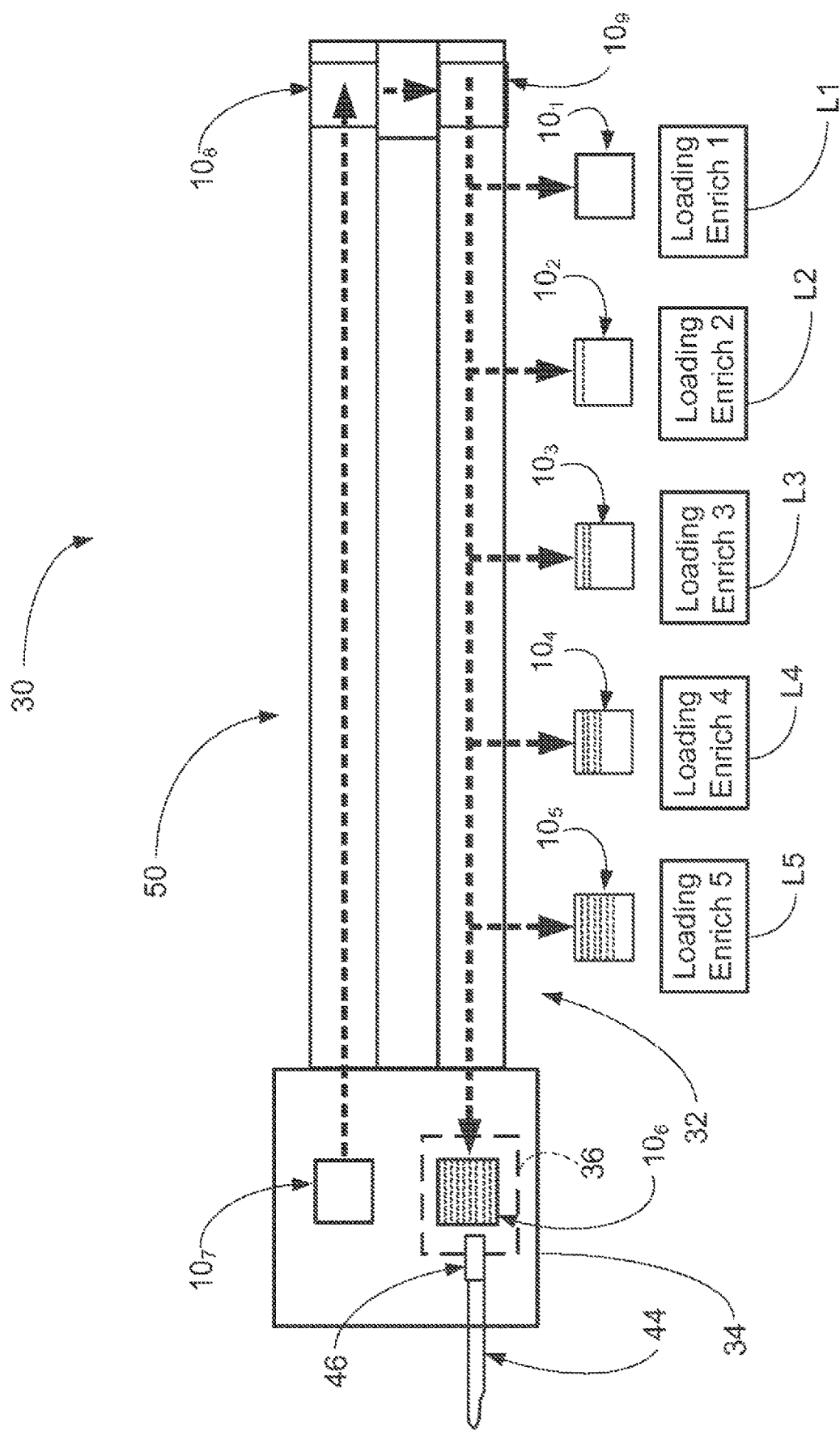
FIG. 3 diagrammatically shows an overhead view of an automated pellet loading system employing magazines of the type shown in FIGS. 1 and 2.

With reference to FIG. 3, a diagrammatic overhead view is shown of an automated pellet loading system 30 employing magazines 10 of the type shown in FIGS. 1 and 2. To increase throughput, multiple pellet magazines 10 are contemplated to be used in production, e.g. in illustrative FIG. 3 nine magazines 10 are shown at various points in the loading process. The pellet magazines 10 are preferably identified by barcodes, RFID tags, or another suitable tracking feature (not shown). The pellet magazines 10 are routed to individual loading stations via a pellet loading conveyer belt 32. To minimize the likelihood of mixing pellets of different types, in some embodiments each pellet loading station handles pellets of a single type (i.e. a single composition and enrichment level). In the illustrative pellet loading system of FIG. 3, the pellet loading conveyor belt 32 connects with five loading stations L1, L2, L3, L4, L5 for five different enrichment levels. In some embodiments, it is contemplated for one or more loading stations to be designated for loading pellets of a non-fuel type, such as pellets comprising a neutron poison, or spacer pellets that do not contain either enriched uranium or neutron poison. At each pellet loading station, pellets of the type handled by that station are loaded into one or more of the pellet bores 12 (see FIG. 2) of the magazine 10. Thus, as diagrammatically indicated in FIG. 3, magazine $10_1$ is empty when it reaches the first loading station L1 (for pellets designated "Enrich 1"). In this illustrative example, pellets are loaded into one pellet bore, and then the magazine is transferred by the conveyor belt 32 to the second loading station L2 (for pellets designated "Enrich 2"). Note that the designations herein of "Enrich 1", "Enrich 2", and so forth are arbitrary designations, and in general the enrichment level of "Enrich 1" may be the same as, higher than, or lower than, the enrichment level of "Enrich 2", and similarly for other "Enrich-" level designations. Magazine 102 arrives at the second pellet loading station L2, and its second pellet bore is loaded with pellets of the "Enrich 2" type and then the magazine is transferred to the third loading station, arriving at the third loading station L3 as illustrated magazine $10_3$ for loading of pellets designated "Enrich 3". At the third loading station L3 two pellet bores are loaded with "Enrich 3" pellets, and the magazine is then transferred to the fourth loading station L4 arriving as illustrative magazine $10_4$ for loading of pellets designated "Enrich 4". At the loading station L4 two more pellet bores are loaded, this time with "Enrich 4" type pellets. Finally (in the illustrative example), illustrative magazine $10_5$ arrives at the fifth loading station L5, where two more pellet bores are loaded, now with "Enrich 5" type pellets.

In the illustrative example of FIG. 3, each pellet bore 12 is shown as being fully loaded over the entire bore length with pellets. However, this is not necessary. For example, if a given axial zone of the fuel rod being loaded has fewer pellets than are needed to completely fill a magazine pellet bore, then the bore is suitably only partially filled, with the number of pellets needed to complete that axial zone. On the other hand, if a given axial zone has more pellets than fit into a single magazine pellet bore, then the loading station suitably fills two (or more, as needed) pellet bores of the magazine with the pellets for that zone type.

It is also contemplated for one loading station to partially fill a pellet bore of the magazine and then to have the next station downstream along the fuel loading conveyor belt add more pellets of a different pellet type to fill that bore. However, this approach has the disadvantage of making it more difficult to track the pellets of a given type. Accordingly, in some embodiments each pellet bore of the magazine is loaded with pellets of only one type, thus simplifying tracking and record-keeping.

Similarly, if the total number of pellets that can be loaded into all the bores of the pellet magazine is less than the total number of pellets to be loaded into the fuel rod, then two or more pellet magazines may be used to carry all the pellets for a single fuel rod. Alternatively, to enhance tracking it may be preferred to employ only a single pellet magazine to load each fuel rod, in which case the bore length and the number of pellet bores in the magazine should be chosen to be sufficient to carry all pellets for a single fuel rod.

On the other hand, if the total number of pellets to be loaded into the fuel rod is substantially smaller than the total capacity of all the bores of the pellet magazine, then some pellet bores of the magazine may be left empty. This generally does not introduce any tracking issues.

With continuing reference to FIG. 3, after the pellet loading conveyor belt passes the magazine through the last (i.e. furthest downstream) pellet loading station, the conveyor belt 32 then moves the filled pellet magazine $10_6$ to a rod loading station 34. Although not shown in FIG. 3, it is contemplated to include various processing and/or recordation or tracing sub-stations along the pellet loading conveyor belt. For example, such sub-stations may record the pellet part number, batch, weight, rows loaded, or other information. Such sub-stations may weigh the pellet magazine between pellet loading stations, and the change in weight before/after passing through a given station is then the weight of the pellets loaded into the pellet magazine at that station. In some embodiments the pellet magazine may be made of a transparent or translucent material (e.g. a clear plastic material) and optical measurements may be performed to count the number of pellets in each pellet bore. Even if the pellet magazine is made of an opaque material (e.g., a metal), the slots that receive the injection finger (see FIGS. 1 and 2) provides access for such optical measurements. If the pellet magazine includes an RFID tag (or serial number bar code), then one or more RFID tag reader substations (or bar code readers) may be included to track the movement of the magazine. A gamma camera 36 (diagrammatically shown in phantom by dotted lines in FIGS. 3 and 4) can also be arranged to acquire a gamma radiation image of the filled pellet magazine $10_6$ at the rod loading station 34 prior to transfer of the pellets into the fuel rod. Because the pellet magazine 106 is compact, i.e., of small aspect ratio as compared with the long thin fuel rod, the gamma camera 36 can be relatively small and can be mounted in stationary fashion with the gamma radiation image acquired without moving the imaged pellet magazine 106. By contrast, gamma camera imaging of a filled fuel rod typically entails moving either the rod or the gamma camera to scan the extensive length of the fuel rod, which can lead to various errors and, if imaging is acquired during movement, potential for motion artifacts in the acquired gamma radiation image. Other monitoring and recordation substations are also contemplated. The acquired tracking and recordation data are suitably stored in a tracking computer or other electronic tracking system (not shown).

Figure 4:
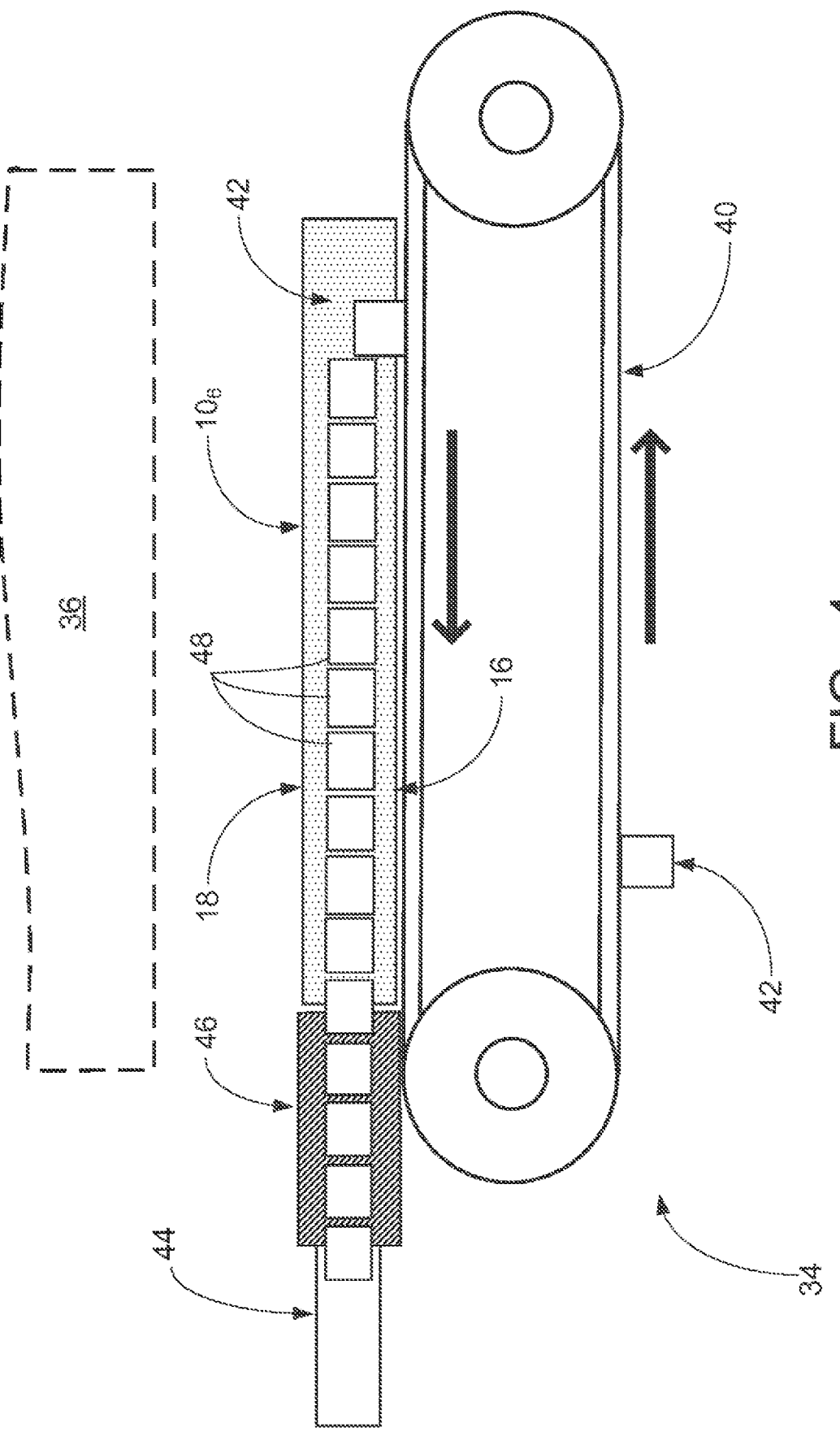
FIG. 4 diagrammatically shows the rod loading station of the pellet loading system of FIG. 3.

With continuing reference to FIG. 3 and with further reference to FIG. 4, after the pellet loading conveyor belt 32 passes the magazine through the last (i.e. furthest downstream) pellet loading station, the conveyor belt then moves the filled pellet magazine $10_6$ to a rod loading station 34. A more detailed diagrammatic side view of the rod loading station 34 is shown in FIG. 4. The magazine RFID tag (or bar code, not shown) is optionally scanned at the fuel rod loading station 34 to provide location and traceability information for the pellet magazine unloading operation. The illustrative fuel rod loading station 34 includes a rotating timing belt 40 carrying one or more (illustrative two) ejection fingers 42. An (initially) empty fuel rod 44 is aligned with the pellet bore to be unloaded using a lateral or side movement mechanism (not shown in FIG. 4 but acting to move the magazine laterally transverse to the pellet bores, i.e. into or out of the sheet in the side view of FIG. 4). Optionally, a transition element 46, e.g. a tubular adapter, facilitates coupling between the pellet bore and the fuel rod 44. FIGS. 3 and 4 show only the open end of fuel rod 44 proximate to the rod loading station 34; the end distal from the rod loading station may be left open during fuel pellet loading, or is optionally capped by an end cap to ensure the pellets cannot come out the distal end. If capped, the cap is preferably a temporary cap with air holes to avoid developing a backpressure of compressed air in the fuel rod 44 as the fuel pellets are pushed into the fuel rod. With the fuel rod 44 and the transition element 46 aligned with the pellet bore currently being unloaded, rotation of the timing belt 40 moves an ejection finger 42 into the slot 14 of the pellet bore 12 being unloaded and that is designed to receive the ejection finger 42 (see FIGS. 1 and 2 showing the ejection finger slots 14 of the pellet bores 12) and the continued rotation of the timing belt 40 drives the ejection finger 42 from the end of the slot 14 furthest from the fuel rod 44 through the length of the slot 14 so as to drive fuel pellets 48 in the pellet bore into the transition element 46. As more pellets 48 are pushed into the transition element 46, the first pellets to enter are pushed further along through the transition element 46 and then into the fuel rod 44. After all pellets in the pellet bore are driven into the transition element 46 (or furthermore into the fuel rod 44), the lateral or side movement mechanism moves another pellet bore 12 of the magazine into alignment with the transition element 46 and fuel rod 44, and the process is repeated for all bores containing fuel pellets until the magazine is completely unloaded. At this point, there are still a few pellets remaining in the transition element 46. A separate pushing device (not shown) suitably drops down to push these remaining pellets out of the transition element 46 and into the fuel rod 44. The now-loaded fuel rod is then removed and the open end through which the pellets were loaded is capped by an end cap.

It will be appreciated that, although again not shown, the rod loading station 34 can have various monitoring and/or tracking features, such as an RFID or bar code reader, a scale for monitoring the weight of the magazine (where the change in weight before/after unloading a pellet bore corresponds to the weight of pellets that were carried in in that bore), the illustrative gamma camera 36, optical sensors, or so forth.

With returning focus on FIG. 3, after all the loaded pellet bores are unloaded the now-empty pellet magazine $10_7$ is transported by a magazine return belt 50 back to the beginning (i.e. extreme upstream position) of the pellet loading conveyer belt 32 to be reused to load more pellets into fuel rods (diagrammatically indicated in FIG. 3 by illustrative pellet magazine $10_8$ at the terminus of the return belt 50 and by illustrative pellet magazine $10_9$ at the starting position on the conveyor belt 32.

Conceptually, the illustrative magazines $10_1$, $10_2$, $10_3$, $10_4$, $10_5$, $10_6$, $10_7$, $10_8$, $10_9$ can be viewed as diagrammatically illustrating a single magazine at various different points in time along its processing. Additionally or alternatively, illustrative magazines $10_1$, $10_2$, $10_3$, $10_4$, $10_5$, $10_6$, $10_7$, $10_8$, $10_9$ can be conceptually viewed as diagrammatically illustrating different magazines at different points along the loading process. This latter view comports with an advantage of the system, namely that a plurality of magazines can be processed simultaneously with each magazine being at a different point along the process, e.g. a magazine $10_2$ can be being loaded at pellet loading station L2 while simultaneously a magazine $10_3$ is being loaded at pellet loading station L3 and simultaneously the pellets stored in a fully loaded magazine $10_6$ are being transferred into a fuel rod 44 at the rod loading station 34, and so forth.

FIGS. 1-4 are merely illustrative, and numerous variants are contemplated. For example, the slots that receive the ejection finger can be located on the top of the pellet magazine rather than on the bottom as illustrated, in which case the timing belt carrying the ejection fingers is suitably located to engage the slots on the top surface of the magazine. It is also contemplated to omit the slots entirely and to employ a push rod at the rod loading station to drive the pellets into the transition element and thence into the fuel rod. In this alternative embodiment, the same push rod could be extended through the transition element to completely push all pellets into the fuel rod. As another variant, it is contemplated to omit the transition element, and to instead incorporate a flange or other coupling element integrally onto the ends of the pellet bores that mate with the fuel rod.

In the illustrative example, the pellet bores are open at both ends. However, it is contemplated to have the pellet bores have one end closed off, so that each pellet bore has a single open end. In this case the ejection finger engagement would be modified to insert into the slot between the closed end of the pellet bore and the pellet immediately neighboring that end. As further illustrative variant, the illustrative conveyor belts can be replaced by other conveyance systems.

The disclosed fuel rod loading systems and methods have substantial advantages.

The pellet magazine can be routed to any number of pellet loading stations using common conveyance systems. This allows for complex rod designs with multiple pellet zones (and hence complex axial composition and/or enrichment profiles) without a significant impact on cycle time because the magazines are loaded in parallel. By comparison, vibratory loading systems typically require all of the enrichment types to be available at the pellet loading station. The operator must load and unload trays for each zone to be loaded.

The use of a designated pellet loading station for each pellet type is an effective mechanism for isolating the different pellet types. Only one $^{235}$U enrichment or part number may be available at any given pellet loading station. This minimizes the likelihood of inadvertent mixing of pellets of different types. If pellets of only one type are loaded into any given pellet bore of the magazine, then once loaded into the magazine the pellets are effectively isolated by pellet type when presented to the rod loading station.

Conventional vibratory loading systems typically load twenty or more rods at the same time to increase rod loading throughput. In this case, the pellets can jump from one row to another with any processing anomaly. If such pellet crossover between simultaneously loaded rods occurs, then all of the involved fuel rods typically must be scrapped, together with the loaded pellets. By comparison, it is estimated that the disclosed magazine-based rod loading approach can achieve rod-to-rod cycle times of 30 seconds with single rod loading, thus providing high throughput while eliminating the possibility of pellet crossover between simultaneously loaded rods. More generally, single rod processing is advantageous because only one rod is affected (and likely must be scrapped) if there is an issue with the pellet loading.

While illustrative FIG. 3 includes five pellet loading stations for five different $^{235}$U enrichment levels, more (or fewer) stations can be provided, and moreover the stations can be designated for pellets of other types. The multi-station aspect enables loading of uranium dioxide ($UO_2$), burnable poison (BP) pellets, and Gadolinium pellets, among other types. If desired, separate magazines may be used for different pellet types to minimize the potential for cross-contamination. The changeover between pellet types is minimal.

The disclosed magazine-based pellet loading system has a small manufacturing floor footprint compared with other rod loading systems. The cost of the loading system is also expected to be minimal, and operator intervention is reduced. In vibratory systems, operators handle large, heavy sheets of pellets multiple times during the rod loading operation. In contrast, the disclosed magazine-based rod loading system requires minimal operator handling of pellets. The potential of airborne contamination is also expected to be substantially lower with the disclosed magazine-based rod loading systems as compared with vibratory systems that agitate the pellets. Ventilation can be provided in the areas where pellets are handled (e.g. the pellet loading stations and the rod loading station), while the pellet magazines can be covered during transportation from station to station (e.g. along the conveyor belts 32, 50 running between the various stations L1, L2, L3, L4, L5, 34).

As already noted, magazine weight can be monitored at weigh stations making it possible to obtain pellet weight information by weighing the magazine at the loading stations. Similarly, optical (or other) measurement of segment length may be performed on the pellets in a pellet bore via the ejection finger slots. Optional gamma camera 36 can also be provided to directly measure $^{235}$U enrichment levels of every pellet in the magazine (which itself is tracked by an RFID, bar code, or other tracking mechanism) thus providing detailed tracking of the contents of the loaded fuel rod.

As yet a further advantage, low forces are exerted on the pellets compared to other methods, and the force to push the pellets into the magazine may be measured and controlled.

In the illustrative examples, the rod loading station 34 unloads pellets 48 from the pellet bores 12 directly into the fuel rod 44 (optionally via the transition element 46). In a variant embodiment, it is contemplated to instead unloaded into a v-trough, or into a transparent connector rod equal in length to the fuel rod length, so that the complete stack of pellets may be visually inspected prior to insertion into the fuel rod.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A method of loading and unloading a pellet magazine adapted to carry pellets for placement into a nuclear fuel rod, the method comprising:
   (i) transferring the pellet magazine in succession in a predetermined order to respective pellet loading stations of a plurality of pellet loading stations, where the respective pellet loading stations each have an associated type of the pellets;
   (ii) at each pellet loading station, loading pellets of the associated type into at least one pellet bore of the pellet magazine;
   (iii) transferring the pellet magazine to a rod loading station; and
   (iv) after operation (iii) is complete, unloading the pellets from the pellet magazine and loading the pellets into a nuclear fuel rod so as to transfer an ordered sequence of pellets into the nuclear fuel rod.

2. The method of claim 1 wherein the operations (i) and (ii) include:
   at a first pellet loading station of the plurality of pellet loading stations, loading nuclear fuel pellets with a first $^{235}$U enrichment level into the at least one pellet bore of the pellet magazine; and
   at a second pellet loading station of the plurality of pellet loading stations, loading nuclear fuel pellets with a second $^{235}$U enrichment level different from the first $^{235}$U enrichment level into the at least one pellet bore of the pellet magazine.

3. The method of claim 2 wherein the nuclear fuel pellets at the first pellet loading station and the nuclear fuel pellets at the second pellet loading station are loaded into a same pellet bore of the at least one pellet bore of the pellet magazine.

4. The method of claim 2 wherein the nuclear fuel pellets at the first pellet loading station and the nuclear fuel pellets at the second pellet loading station are loaded into different pellet bores of the at least one pellet bore of the pellet magazine.

5. The method of claim 1 wherein the operations (i) and (ii) include:
   at a first pellet loading station of the plurality of pellet loading stations, loading nuclear fuel pellets with $^{235}$U enrichment into at least one pellet bore of the pellet magazine; and
   at a second pellet loading station of the plurality of pellet loading stations, loading burnable poison pellets into at least one pellet bore of the pellet magazine.

6. The method of claim 5 wherein the nuclear fuel pellets at the first pellet loading station and the burnable poison pellets at the second pellet loading station are loaded into a same pellet bore of the at least one pellet bore of the pellet magazine.

7. The method of claim 5 wherein the nuclear fuel pellets at the first pellet loading station and the burnable poison pellets at the second pellet loading station are loaded into different pellet bores of the at least one pellet bore of the pellet magazine.

8. The method of claim 1 wherein the operation (iv) includes:
   unloading the pellets from the at least one pellet bore of the pellet magazine into the nuclear fuel rod by operations including inserting an element into a longitudinal slot extending along the at least one pellet bore of the pellet magazine and moving the inserted element along the longitudinal slot to push pellets out of the pellet bore.

9. The method of claim 1 further comprising:
   after completing the operation (ii), acquiring a gamma radiation image of the pellet magazine.

10. The method of claim 1 wherein the operation (iv) further comprises:
    wherein the at least one pellet bore includes a plurality of pellet bores and said pellet magazine is moved laterally such that said pellets are removed from successive of said pellet bores until the pellet magazine is empty.

11. The method of claim 1 wherein the operation (iv) involves removing the pellets from the pellet magazine into a transition element with the pellets then being loaded into the nuclear fuel rod from the transition element.

12. The method of claim 11 wherein the pellets pass immediately through the transition element into the nuclear fuel rod.

13. The method of claim 1 wherein the operation (iv) involves loading the pellets directly from the pellet magazine into the nuclear fuel road.

14. The method of claim 1 wherein the operation (iv) involves removing the pellets from the pellet magazine into one of a v-trough and a transparent connector rod so as to allow visual inspection of the pellets.

* * * * *